United States Patent [19]

Hooke

[11] Patent Number: 5,380,603
[45] Date of Patent: Jan. 10, 1995

[54] BATTERY TERMINAL SEAL

[75] Inventor: John W. Hooke, Warrensburg, Mo.

[73] Assignee: Hawker Energy Products, Inc., Warrensburg, Mo.

[21] Appl. No.: 30,762

[22] Filed: Mar. 12, 1993

[51] Int. Cl.⁶ .............................. H07M 2/30
[52] U.S. Cl. .................... 429/180; 429/183; 429/184
[58] Field of Search .............. 429/178, 179, 180, 181, 429/182, 183, 184

[56] References Cited

U.S. PATENT DOCUMENTS

| | | |
|---|---|---|
| 1,484,306 | 2/1924 | MacKenzie . |
| 2,148,738 | 2/1939 | Feldkeller ................. 429/181 X |
| 3,522,105 | 7/1970 | Sabatino ................. 429/182 |
| 4,078,122 | 3/1978 | Lötzsch et al. ............ 429/184 |
| 4,245,014 | 1/1981 | Veit et al. ................ 429/184 |
| 4,769,299 | 9/1988 | Nelson ................... 429/57 |
| 5,182,178 | 1/1993 | Brizendine et al. ......... 429/160 |

FOREIGN PATENT DOCUMENTS 744277  2/1956  United Kingdom ................ 429/179

OTHER PUBLICATIONS

Gates Energy Products, Inc., "Gates SBS Battery Range–Design Manual" Oct. 1986.

Primary Examiner—Stephen Kalafut
Attorney, Agent, or Firm—Lorusso & Loud

[57] ABSTRACT

A sealed, through partition terminal for an electrochemical cell is disclosed featuring a high conductivity terminal member embedded in a lead strap current collector, penetrating a through hole in the partition wall. A cup-like well is formed around the hole to receive the terminal which is located and immobilized by the combination of a fastening member which grips the outer surface of the terminal, and by an epoxy contained within the cup-like well which embeds the fastening member and surrounds the terminal. An elastomeric sealing member is preferably compressed between the strap and the underside of the cup-like well.

16 Claims, 3 Drawing Sheets

BATTERY TERMINAL SEAL

BACKGROUND OF THE INVENTION

This invention relates to sealed, through partition terminals for electrochemical cells, and more particularly to such terminals for lead-acid batteries.

A prevalent problem with terminal seals in lead-acid batteries is corrosion at the terminal, allowing acid to propagate past the seal interface. A standard design approach in the past has been to extend the terminal seal life by making the seal interface between the lead component or terminal and the battery container as long as possible. The configuration most used in the industry is a lead terminal provided with a ribbed outer surface that is insert molded into the plastic battery container. This engineering approach has been generally successful but suffers from the drawback of inherent expense stemming from the complicated container molding process and the added assembly cost of the battery.

An improvement in this known terminal system is disclosed in U.S. Pat. No. 5,182,178 (Brizendine et al.) which discloses the use of an elastic adhesive material bonded to the ribbed lead insert and making sealing contact with the enshrouding plastic molding. Furthermore, a harder, higher conductivity brass insert connector is insert molded in one end of the lead connector to improve the terminal connection and current carrying capability. Nevertheless, this system still suffers from being relatively expensive to produce.

It is an object of the present invention to provide a sealed, through partition terminal for an electrochemical cell which is relatively inexpensive to produce and has high sealing reliability.

It is a further object to produce a sealed, through partition terminal for a lead-acid cell having a high current carrying capability, and which is easy to assemble in a continuous production process.

SUMMARY OF THE INVENTION

These and other objects are met by the sealed, through partition cell terminal of the invention, and the resultant cell. Generally, the cell includes first and second opposite polarity electrodes positioned within a cell container having a closing partition wall, and electrolyte absorbed within the plates and separators. The partition wall is provided with a cup-like well with a through hole in which is fitted the terminal member. The terminal member is formed of a stud portion of high conductivity passing through the hole in the well, and has an enlarged base anchored within a strap current collector connected to a given set of one polarity of electrodes within the cell. A fastening member grips and preferably embeds in the outer surface of the stud portion of the terminal, and is also positioned within the well. A solidified resin surrounds and immobilizes the stud portion of the terminal while leaving an end free for external electrical connection. The resin at least partially embeds the fastening member. Preferably an elastomeric sealing member is confined, at a predetermined residual stress, between the strap, partition and terminal member.

In assembling the terminal, the fastening member, preferably a one-way locking nut, is pressed over the outer surface of the stud, while supporting the stud, so as to grip into the malleable surface of the stud and locate and immobilize it prior to embedment with the resin. When the locking nut is set, preferably an elastomeric sealing member sandwiched between the strap current collector and underside of the well is placed in compression and its excursion is confined both axially and radially. Thereafter the embedding resin is introduced into the well, and around the stud and fastening members.

BRIEF DESCRIPTION OF THE DRAWINGS

Preferred embodiments of the invention will be illustrated in conjunction with the accompanying drawings, in which like numerals designate like parts and in which:

FIG. 4 is a perspective view of a preferred fastening member used in the terminal seal of the invention;

FIG. 5 is a partial sectional view similar to that of FIG. 3 showing an alternative embodiment of the invention;

FIG. 6 is perspective view of the fastening member employed in FIG. 5;

FIG. 7 depicts an alternative embodiment of the invention, shown in elevational section view similar to FIG. 2.

DESCRIPTION OF THE PREFERRED EMBODIMENTS OF THE INVENTION

Although the invention is broadly applicable to various types of electrochemical cells and batteries, the detailed description will apply to a normally sealed or "valve-regulated" lead-acid battery of the starved electrolyte type, in which gases generated internally namely oxygen are recombined within the battery on charge and overcharge, without significant loss of weight (electrolyte) over its useful life (see U.S. Pat. No. 3,862,861 to McClelland et al.).

Figure 1:
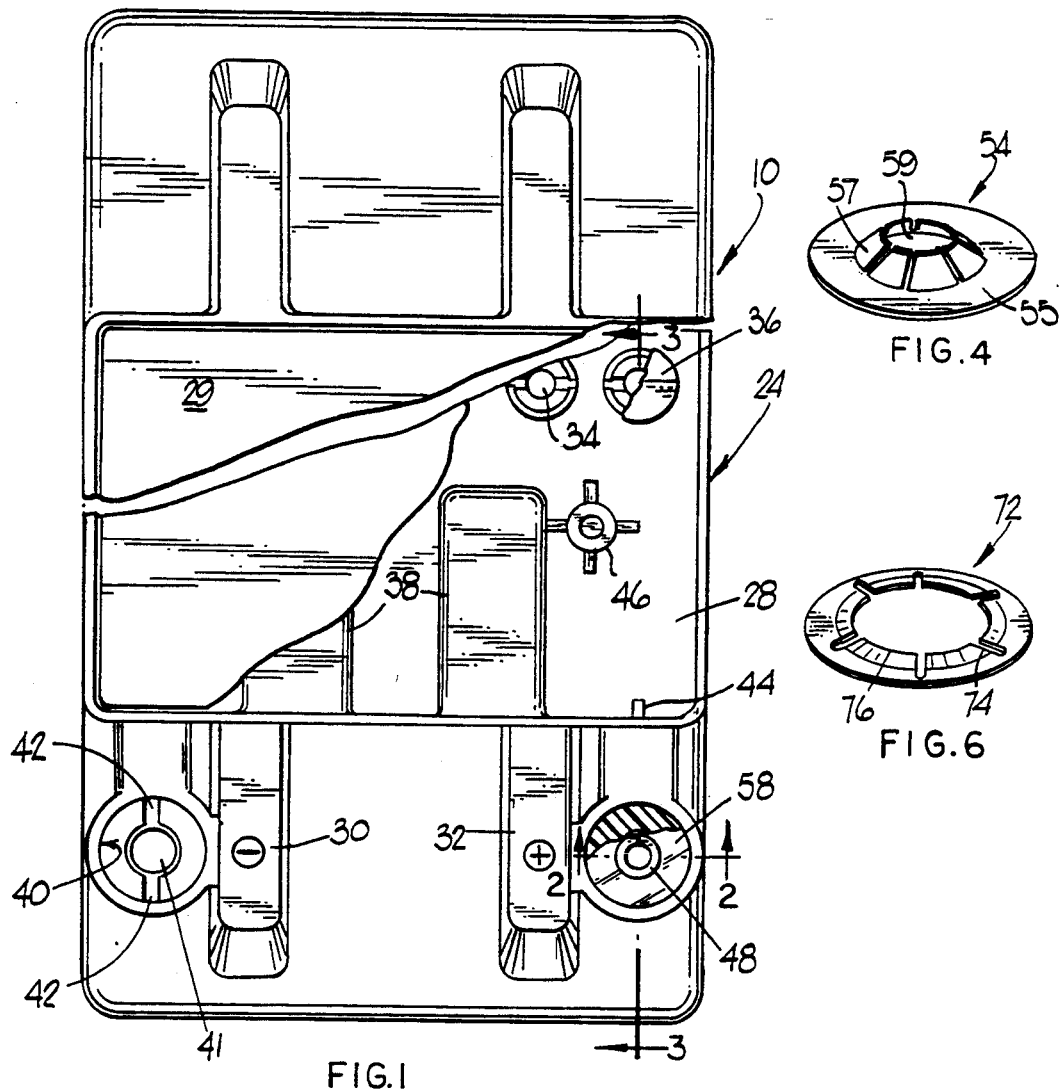
FIG. 1 is a plan view partially cut away, of a battery employing the terminal seal of the invention.
Figure 2:
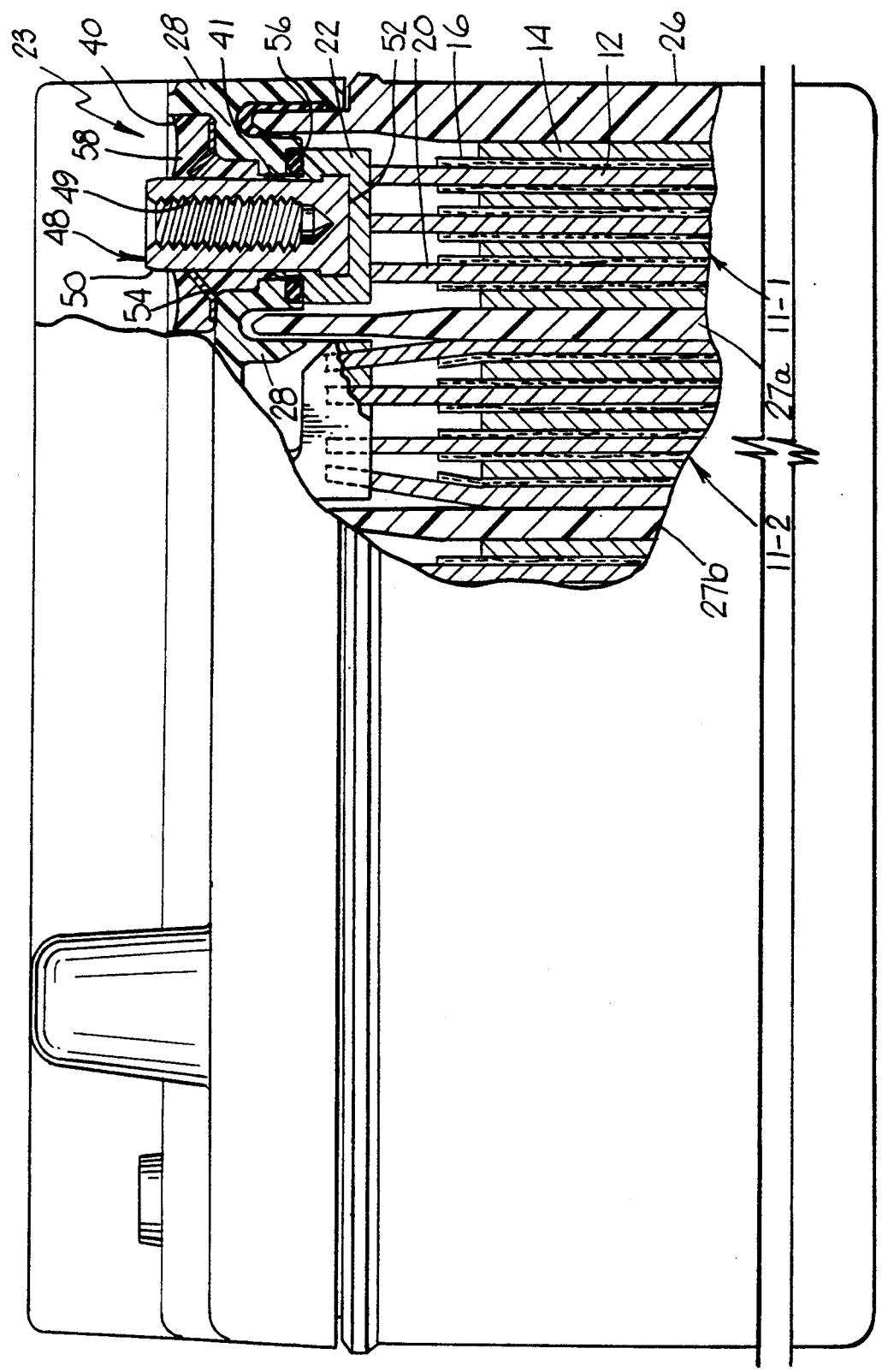
FIG. 2 is an elevational partial sectional view taken along 2—2 of FIG. 1.
Figures 3, 8:
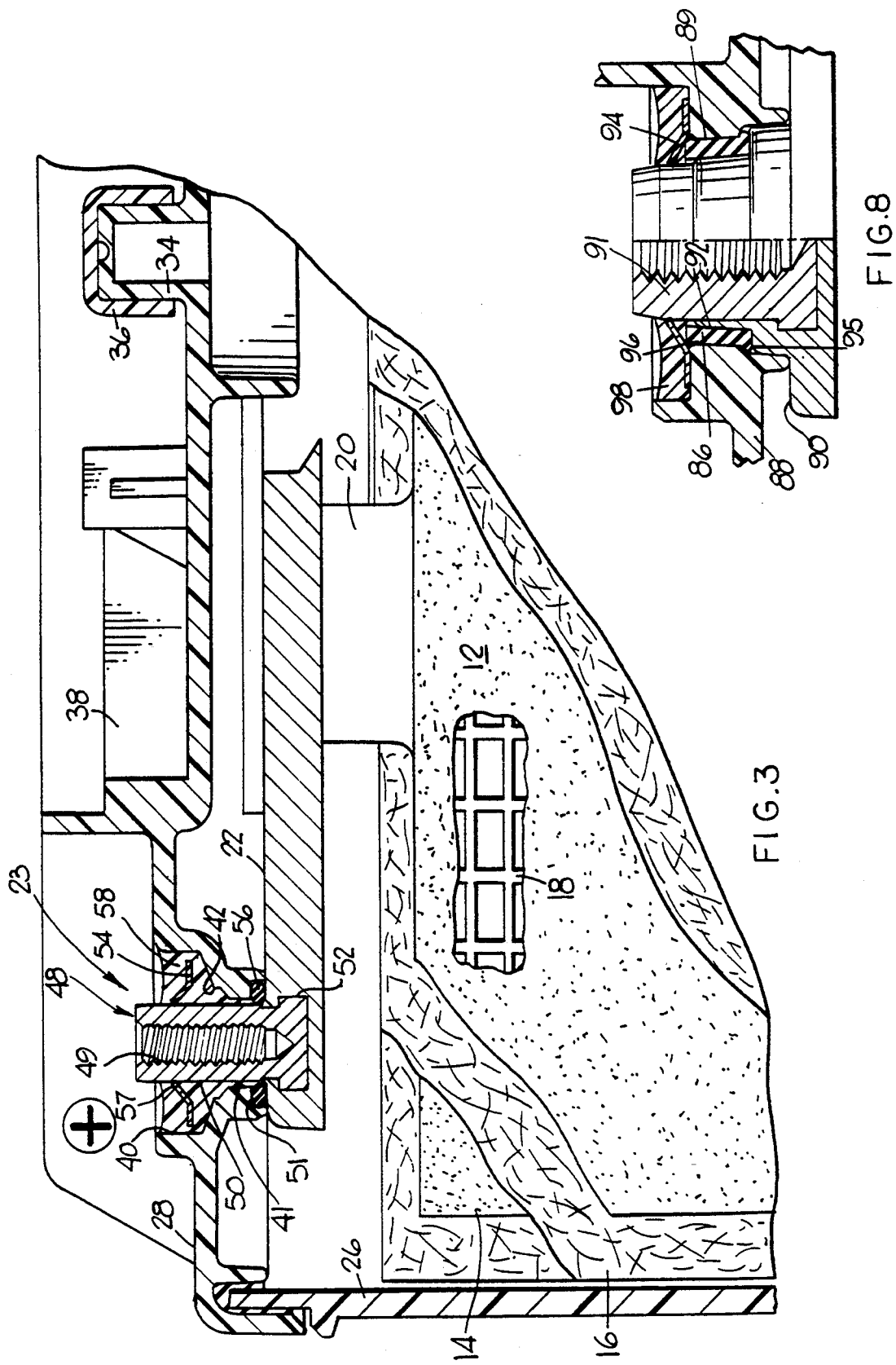
FIG. 3 is a partial sectional, broken-away view taken along 3—3 of FIG. 1.
FIG. 8 is a view similar to FIG. 5 showing still another alternative embodiment.

Referring to FIGS. 1, 2 and 3, battery 10 is composed of a plurality of series connected cells 11-1, 11-2 . . . each of which includes at least one porous positive electrode plate 12, porous negative electrode plate or plates 14, porous absorbent separator 16 interleaved between and pressed against the opposite polarity plates, and a sulfuric acid electrolyte absorbed within the porous plates and separator. Preferably the plates are formed of lead grids 18 on which the active material of the plate is affixed by pasting, and the grid substrate is preferably provided with integral current collector tabs 20 joined together by the cast-on-strap process to form strap current collector 22. This current collector strap is connected to the sealed output terminal 23 of the invention, which will be disclosed in more detail hereafter. The lead utilized in the grid substrate 18, tab(s) 20, and connecting strap 22 is preferably of high hydrogen overvoltage e.g. pure lead or suitable alloy material, most preferably a lead-tin alloy having a tin content from about 0.3 to about 3.0 weight percent. The acid electrolyte used in the battery normally readily wets and normally creeps along the surface of these lead components, particularly along lead oxide films which are naturally present on the surface of the component parts.

The components of the battery are housed within container 24. The container generally comprises a standard open-mouthed jar 26, including cell partition members 27a, 27b . . . to which is affixed, by heat sealing, or by an adhesive or the like, inner lid partition 28. The inner lid is a fairly complex molded part equipped with short circuit terminal protectors 30, 32, vent openings 34 closed with bunsen resealable valves 36 to permit gas release if the internal pressure of the battery exceeds a predetermined threshold, domes 38 housing over-the-wall intercell electrical connections, and pertinent to the subject invention cup-like terminal well 40, provided with a through bore 41, and notches 42 for resin flow. The entire inner lid 28 is desirably formed by injection molding a suitable engineering plastic material which is resistant to sulfuric acid, including such materials as Noryl® (polyphenylene oxide), ABS, polypropylene, and the like. An outer cover 29 which may be attached by staking or heat sealing to risers 44, 46 is positioned over the bunsen valves and domed intercell connection cavities.

In accordance with the invention, a sealed terminal connection 23 is provided which penetrates bore 41 in partition wall 28. Terminal member 48 is formed of an electrically conductive material which, while still malleable (Rockwell hardness preferably less than about 30T-78), is preferably harder and more conductive than the lead metal forming strap 22. The relatively hard terminal facilitates long-life, creep resistant inter-battery connections. As illustrated in FIGS. 1-3, female terminal 48 which may be formed of brass or other copper alloy, is provided with a central internally threaded bore 49 to receive an external electrical connection, and to assist in assembly of the sealed terminal, has a barrel or stud portion 50 which passes through hole 41 and is surrounded by well 40, and which is connected to an enlarged base 52 which is anchored preferably by embedment in strap current collector 22. The base may suitably be non-circular e.g. hexagonal, to provide torque resistance to the terminal. Preferably a metallurgical bond is formed between terminal 48 and strap 22, such as by tin dipping of terminal 48 prior to the casting operation.

A fastening member 54 grips (and embeds in) the outer surface of stud portion 50 of the terminal to thereby locate the terminal within cavity 40 with the proper orientation, and provides a retaining force, resistant to decay, to maintain elastomeric sealing member e.g. o-ring 56 in compression between the partition i.e. the under surface of cup-like well 40, in a counterbore 51 provided therein, and the upper surface of strap 22 as well as against the outside surface of terminal member 48. Excursion of the o-ring is confined both radially and axially. This provides one portion of the sealing surface to prevent or suppress electrolyte creepage past the terminal.

The preferred form of gripping member 54 is a one-way locking nut, including a so-called Tinnerman connector, push-on retainer, or "speed nut", shown in perspective in FIG. 4. As seen there, the push-on retainer 54 is provided with a generally annular base 55, and a series of integrally attached inclined spring tabs 51. As the push-on retainer is set by pressing it down over the outer surface of the stud 48, by virtue of the relative sizing of the outer diameter of stud terminal 48 relative to opening 59 in the push-on retainer (the inside diameter 59 of the push-on retainer is slightly less than the outside diameter of stud 48) stud tabs 57 are deflected slightly and, after fully seating push-on retainer 54 in the bottom of the cavity formed in cup-like well 40, tabs 57 embed and grip in biased fashion into outer surface 50 of stud 48, preventing any axial movement therebetween. By using a predetermined force for setting the push-on retainer, one is able to achieve a consistent, repeatable level of compression on the elastomeric sealing member. This compensates for tolerance buildup stemming from component variations.

After fastening member 54 is driven home to locate and immobilize stud terminal 48, also placing o-ring 56 in compression, a liquid resin, preferably epoxy resin, is introduced into the well cavity from the exterior of the cell to flow fully around fastening member 54, also via slots 42 provided in the well, whereby resin 58 at least partially, preferably fully, embeds fastening member 54 and surrounds the stud portion of the terminal. An end thereof is left available for external electrical connection.

It will be appreciated that by using counterbore 51 in the underside of well 40 (part of partition 28) the sealing effect of o-ring 56 is vastly improved. The o-ring is fully confined between the upper surface of strap 22, the barrel of stud 48, and the aforementioned counterbore 51 of well 40. In the past where an o-ring was used without proper confinement, it served principally as a washer or dam for resin containment rather than providing the sealing effect that an o-ring undergoes when properly confined and seated (see, for instance, U.S. Pat. No. 4,769,299 to Nelson, in which an o-ring is used as a washer and/or dam). The sealing effect is further enhanced by applying a coating of an elastic adhesive onto strap 22 where it interfaces with o-ring 56. Suitable elastic adhesives for this purpose are disclosed in U.S. Patent No. 5,182,178, an especially preferred material being sold under the trade name CHEMLOK® EP 487 (Lord Corporation, Elastomer Products Division). These materials are typically one-part or two-part polyurethane elastomers, formed from suitable isocyanate and active hydrogen supplying monomers or blocked polymers. Polysilane-containing elastomers, preferably polysilane-containing urethane elastomers are also suitable as sealing enhancing coatings.

When no elastomeric sealing member is used between strap 22 and partition 28, the aforementioned elastic adhesive should be applied to the strap/partition interface, to suppress corrosion.

Referring now to the embodiment of FIGS. 5 and 6, a higher current carrying capability terminal is illustrated. In this embodiment a stud 60 formed of brass and enlarged cross section compared to the embodiment of FIG. 1 has an enlarged hex head 62 embedded in strap member 64, and partition 28' is provided with counterbores 66 and 68 for receiving stud 60 and interposed rubber packing 70. In this embodiment push-on retainer 72, shown best in FIG. 6, is employed and is provided with a series of notch openings 74 which allow epoxy 78 to easily flow around and embed the push-on retainer after installation, and also allow tabs 76 to properly deflect and grasp the outer surface of stud 60. Tabs 76 thus serve to immobilize and retain the stud terminal 60 in position, with packing 70 being compressed into sealing engagement within its counterbore 68 and adjoining surfaces of the terminal connector.

In the embodiment of FIG. 7, the general embodiment of FIGS. 1-3 is employed modified by the use of a solid stud member 48', the outer end of which has male threads to receive additional fastening and terminal connecting means. Accordingly, first hex nut 80 is applied over push-on retainer 54 so as to be partially contained within well 40, and partially extending above well 40. Fastener 80 then becomes partially immersed in the solidifying resin 58, leaving an upper uninvaded surface for receipt of a connector 82 e.g. a standard ring terminal connector, secured by lock nut 84.

In FIG. 8, elastomeric packing 86, rather than being confined in a counterbore as in FIG. 5, is bounded by the opening 89 in partition 88, the upper surface of strap 90, terminal 91 with an interposed lead coating 92, and fastening member 94. To establish an effective seal, coating 92 should be integral with the lead of strap 90 i.e. preferably all established in the cast-on-strap operation. In this embodiment packing 86 defines an elongated sealing path with deformed seal-enhancing end segments 95, 96. In the manner previously described resin 98 embeds the terminal seal components.

While certain representative embodiments and details have been shown for the purpose of illustrating the invention, it will be apparent to those skilled in this art that various changes and modifications may be made therein without departing from the spirit or scope of the invention. The invention illustratively disclosed herein suitably may be practiced in the absence of any element which is not specifically disclosed herein.

What is claimed is:

1. A sealed, through partition terminal for an electrochemical cell, including a cell container having a partition wall, first and second electrodes positioned within the cell, a separator interposed between the electrodes, and electrolyte absorbed in the plates and separator, comprising:

the partition wall being provided with a cup-like well with a through hole therein;

a strap current collector, connected to one of the electrodes within the cell, formed of a first conductor, and positioned adjacent the hole;

a terminal member, formed of a second conductor, having a stud portion passing through the hole and being surrounded by the well, and an enlarged base anchored within the strap current collector;

a fastening member gripping and embedding into the outer surface of the stud portion of the terminal, and positioned within the well; and a solidified resin surrounding and immobilizing the stud portion of the terminal while leaving an end thereof free for external electrical connection, and at least partially embedding the fastening member.

2. The terminal of claim 1 wherein an elastomeric sealing member is provided, which surrounds the stud and is compressed between the underside of the well, and the strap current collector.

3. The terminal of claim 1 wherein the cell is a lead-acid cell, the strap current collector is formed of lead, and the terminal is formed of a copper alloy.

4. The terminal of claim 1 wherein the fastening member is a one-way locking nut.

5. The terminal of claim 1 wherein the fastening member is a push-on retainer.

6. The terminal of claim 1 wherein the resin is an epoxy.

7. The terminal of claim 2 wherein the elastomeric sealing member is an o-ring seated in a counterbore formed in the underside of the well.

8. The terminal of claim 2 wherein the elastomeric sealing member is a rubber sleeve seated in a counterbore formed in the underside of the well.

9. The terminal of claim 1 wherein the well is provided with at least one notch configured to permit resin while in a liquid state to flow around and embed the fastening member.

10. The terminal of claim 1 wherein an elastic adhesive is interposed between the strap current collector and partition wall.

11. The terminal of claim 2 wherein an elastic adhesive is interposed between the strap current collector and elastomeric sealing member.

12. The terminal of claim 11 wherein the elastic adhesive is a coating of a polyurethane elastomer.

13. An electrochemical cell, or battery, equipped with the sealed, through partition terminal of claim 1.

14. A sealed, through partition terminal for an electrochemical cell, including a cell container having a partition wall, first and second electrodes positioned within the cell, a separator interposed between the electrodes, and electrolyte absorbed in the plates and separator, comprising:

the partition wall being provided with a cup-like well with a through hole therein;

a strap current collector, connected to one of the electrodes within the cell, formed of a first conductor, and positioned adjacent the hole;

a terminal member, formed of a second conductor, having a stud portion passing through the hole and being surrounded by the well, and an enlarged base anchored within the strap current collector;

an elastomeric sealing member confined and interposed between the strap current collector, partition wall, and terminal member;

a fastening member gripping the outer surface of the stud portion of the terminal, and positioned within the well; and a solidified resin surrounding and immobilizing the stud portion of the terminal while leaving an end thereof free for external electrical connection, and at least partially embedding the fastening member.

15. The terminal of claim 14 wherein the terminal member bears a coating of the same material of the strap current collector, and the elastomeric sealing member contacts such coating on the terminal member.

16. The terminal of claim 14 wherein the elastomeric sealing member is a packing, further confined by the fastening member.

* * * * *